(12) United States Patent
Deal et al.

(10) Patent No.: US 6,312,148 B1
(45) Date of Patent: Nov. 6, 2001

(54) REMOVAL OF GASEOUS PHASE FROM CONTINUOUS MIXING CHAMBER FOR RUBBER COMPOUND

(75) Inventors: Michel Deal, Saint Remy-en-Rollat; Christian Van Meyel, Saint-Bonnet-Prés-Riom, both of (FR)

(73) Assignee: Sedepro Societe Anonyme, Paris (FR)

( * ) Notice: Subject to any disclaimer, the term of this patent is extended or adjusted under 35 U.S.C. 154(b) by 0 days.

(21) Appl. No.: 09/281,137

(22) Filed: Mar. 29, 1999

Related U.S. Application Data

(63) Continuation of application No. PCT/FR98/01689, filed on Jul. 30, 1998, and a continuation-in-part of application No. PCT/FR97/01444, filed on Aug. 1, 1997.

(51) Int. Cl.⁷ .................................................... B29B 7/84
(52) U.S. Cl. ................................ 366/75; 366/89
(58) Field of Search ........................ 366/75, 76.1, 76.6, 366/79, 83–85, 88–91, 101, 102, 106, 107; 425/203, 204, 208, 209

(56) References Cited

U.S. PATENT DOCUMENTS

| | | | |
|---|---|---|---|
| 3,371,379 | * | 3/1968 | Reifenhauser . |
| 3,633,880 | * | 1/1972 | Newmark . |
| 3,917,507 | * | 11/1975 | Skidmore ............................. 425/204 |
| 3,963,558 | * | 6/1976 | Skidmore ............................. 425/203 |
| 3,985,348 | * | 10/1976 | Skidmore ............................. 425/203 |
| 4,063,717 | * | 12/1977 | Booy ..................................... 366/75 |
| 4,065,532 | * | 12/1977 | Wild et al. ............................. 366/75 |
| 4,260,264 | * | 4/1981 | Maki et al. ............................ 366/75 |
| 4,902,455 | * | 2/1990 | Wobbe .................................. 366/75 |
| 5,120,559 | * | 6/1992 | Rizvi et al. . |
| 5,198,171 | * | 3/1993 | Kasahara et al. .................... 425/208 |
| 5,227,425 | * | 7/1993 | Rauline . |
| 5,332,309 | | 7/1994 | Ramazzotti et al. . |
| 5,504,140 | * | 4/1996 | Zanzig et al. . |
| 5,626,420 | * | 5/1997 | Deal et al. ............................ 366/75 |
| 5,718,782 | * | 2/1998 | Fourgon . |
| 5,772,807 | * | 6/1998 | Fourgon . |
| 5,843,249 | * | 12/1998 | Ryba et al. . |
| 5,969,022 | * | 10/1999 | Bova et al. . |
| 6,080,809 | * | 6/2000 | Stuhldreher . |

FOREIGN PATENT DOCUMENTS

| | | | | |
|---|---|---|---|---|
| 19516082 | * | 11/1996 | (DE) ..................................... 366/75 |
| 1431978 | | 4/1976 | (GB) . |

* cited by examiner

*Primary Examiner*—Charles E. Cooley
(74) *Attorney, Agent, or Firm*—Baker Botts L.L.P.

(57) ABSTRACT

A continuous mixing apparatus and process for preparing a rubber compound in an elongated mixing chamber defined by the volume between a radially inner surface of a stator and a radially outer surface of a rotor, the constituents being such that their mixing is capable of producing inside the mixing chamber a product in gaseous phase as the rubber compound is advanced through the elongated mixing chamber from an inlet to an outlet and in which, in at least a part of the mixing chamber, a stream of gas is circulated against the direction of advance of the rubber compound through the mixing chamber to carry the gaseous phase out of the mixing chamber.

13 Claims, 2 Drawing Sheets

REMOVAL OF GASEOUS PHASE FROM CONTINUOUS MIXING CHAMBER FOR RUBBER COMPOUND

This is a continuation of PCT/FR 98/01689, filed Jul. 30, 1998, and a continuation-in-part of PCT/FR 97/01444, filed Aug. 1, 1997.

BACKGROUND OF THE INVENTION

This invention concerns the mixing of rubber. In particular, it relates to the continuous preparation of rubber compounds containing silica as reinforcing agent.

U.S. Pat. No. 5,626,420 discloses a continuous mixing apparatus for preparing a rubber compound. This apparatus has an elongated mixing chamber containing at least one rotor in rotation in a stator, an upstream end and a downstream end, between which the material progressively flows, one or more inlets through which said mixing chamber receives the constituents of the rubber compound and an outlet at the downstream end through which the rubber compound is discharged. The continuous mixing apparatus has the advantage, notably, of making it possible to obtain rubber compounds in which the reinforcing agent—e.g., carbon black—is remarkably well dispersed.

Patent EP 0,501,227 showed that rubber compounds containing silica as reinforcing agent in very large proportions could have remarkable properties for use as a tire tread, on condition, notably, that the silica should have an excellent dispersion in the elastomeric matrix.

It was therefore sought to use a continuous mixer, such as presented in U.S. Pat. No. 5,626,420, in order to employ rubber compounds containing silica as reinforcing agent.

It has been discovered, contrary to expectations, that the use of such a mixer did not make it possible, in all cases, to obtain satisfactory rubber compounds, notably, when those compounds contain silica as reinforcing agent. In particular, instabilities of flow of material into the mixer were sometimes observed. Furthermore, the properties of those compounds proved to be different from those obtained with the known "batch" mixing methods: For example, greater hardness and reduced calcining time (time necessary, at a given temperature, for the vulcanization reaction to start in a sample of the rubber compounds after mixing).

SUMMARY OF THE INVENTION

The invention concerns a continuous mixing method and apparatus making it possible to attain better results, particularly when rubber compounds containing silica are prepared.

In what follows, when the mixing chamber in a given zone is totally occupied by the constituents to be mixed, it is said by convention that the filling rate of that zone is equal to 1. On the other hand, when the volume of the zone of the mixing chamber considered is not totally occupied by the constituents to be mixed, it is then said that the filling rate is less than 1.

The continuous mixing process, according to the invention, for preparing a rubber compound in an elongated mixing chamber defined by the volume between the radially inner surface of a stator and the radially outer surface of at least one rotor in rotation in said stator, comprises:

continuously introducing in the mixing chamber, at one or more points of introduction, different constituents, among which there is at least one base elastomer and at least one reinforcing filler, said constituents being such that their mixing is capable of producing inside the mixing chamber the appearance of at least one product in gaseous phase, channeling the different constituents from their points of introduction to an outlet of the mixing chamber, and circulating, in at least part of the mixing chamber, a stream of gas intended to carry along said gaseous phase out of said mixing chamber.

The circulation of that gas is intended to make possible the extraction from the mixing chamber of the products in gaseous phase likely to appear in the chamber on mixing. This method makes it possible to obtain, notably, for rubber compounds containing silica as reinforcing agent, satisfactory properties. The zone in which the stream of gas is circulated, the "circulation zone," is, in particular, a zone where the filling rate of said constituents is less than one. That stream of gas is preferably circulated in a direction opposite the direction of flow of materials in the course of mixing.

The circulation of said gas also makes it possible to better control the thermal development of the rubber compound.

The invention also concerns a continuous mixing apparatus for preparing a rubber compound which has an elongated mixing chamber containing:

at least one rotor in rotation in a stator;

an upstream end and a downstream end, between which the material progressively flows;

one or more material inlets through which said mixing chamber receives said constituents of the rubber compound;

an outlet situated at the downstream end, through which the rubber compound is expelled; and means for circulating a gas in at least a portion of said chamber called circulation zone.

Said mixing chamber is characterized in that, in the circulation zone, the stator and/or rotor contain a groove.

The stator and/or rotor preferably have at least one continuous thread in the circulation zone, and the groove adjoins the back face of that continuous thread. The groove can have a U or inclined V shape. That groove has the advantage of regulating the circulation of gas, as well as the stability of the flow of material in the mixing chamber.

The means for circulating the gas in the circulation zone preferably circulate that gas against the direction of flow of the material in the mixing chamber. That counterflow circulation increases the speed of the gas relative to the material and promotes good extraction of the products in gaseous phase.

The circulation zone is advantageously situated below the inlet or inlets of the constituents in the mixing chamber.

This makes it possible to disturb the incorporation of those constituents in the elastomeric matrix of the compound as little as possible.

To obtain the tightness of the circulation zone and promote a stable circulation of the gas above and below that zone, the shape of the rotor and/or stator surface is such that one encounters, above and below, a zone whose filling rate is equal to 1.

This has the advantage of strictly limiting the circulation of gas to that circulation zone without disturbing mixing up the line.

DESCRIPTION OF THE DRAWINGS

The characteristics and advantages of the invention will be better understood by reference to the specification which follows and to the drawings, illustrating without limitation a working example in which.

DESCRIPTION OF PREFERRED EMBODIMENTS

Figure 1:
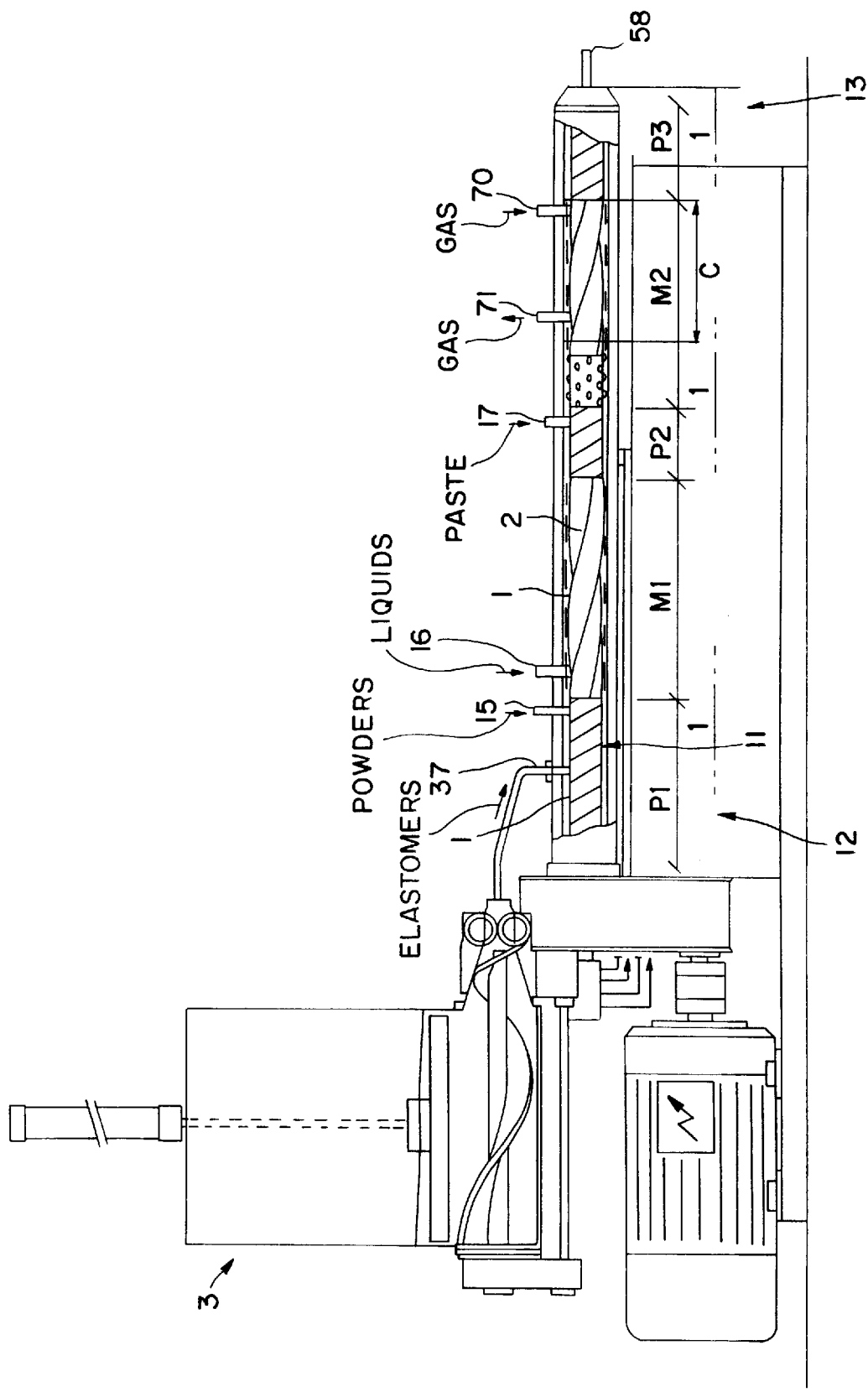
FIG. 1 is a view in elevation of a mixing apparatus according to the invention with portions cutaway.

The continuous mixing apparatus shown in FIG. 1 corresponds substantially to the apparatus described in U.S. Pat. No. 5,626,420, which is incorporated herein by way of reference.

The apparatus contains a mixing chamber 11 within which a rotor 2 turns. The upstream end of the mixing chamber is identified by reference 12 and the downstream end by reference 13.

Upstream of the mixing chamber there are elements 5 for introducing the constituent base elastomers of the rubber mixture. The elastomers are introduced in the mixing chamber through a conduit 57.

The cutaway of FIG. 1 makes it possible to view the inside of the mixing chamber 11. The latter is formed by the space available between the rotor 2 and the stator 1.

Along the rotor 2 there are three zones P1, P2, P3, the action of which is essentially propulsion of the constituents of the mixture and, between the zones P there are separate zones M1, M2, the action of which is essentially mixing.

The precise shape of the rotor and stator (number, pitch and angle of the threads or other shapes) in the different zones makes it possible, notably, to regulate the filling rate to 1 or less in the different zones of the mixing chamber. Optimization of those shapes is rather empirical and requires many experimental tests. The zones where the filling rate can amount to 1 (see 1 in a circle) are indicated in FIG. 1.

The base elastomers are introduced at the upstream end 12 of the mixing chamber into propulsion zone P1.

In said propulsion zone P1, above the first mixing zone M1, the powdery constituents, such as reinforcing fillers, silica and/or carbon black, are introduced through inlet 15.

The liquid constituents, such as extender oils and possibly silica/elastomer bonding agents (silanes), are preferably introduced at the beginning of the first zone M1 through inlet 16.

The other constituents of the rubber compound, such as antioxidants, plasticizers, sulfur and activators, are premixed in a vat with a stirrer in order to obtain a paste. The paste is introduced through inlet 17 into the second propulsion zone P2 between the two mixing zones M1 and M2.

As described in the cited patent, the different constituents are preferably introduced by means of positive displacement pumps.

The second mixing zone M2 contains a gas inlet 70 and an outlet 71 for said gas, which define the gas circulation zone C. The inlet is preferably situated at the downstream end of zone M2, so that the gas is circulated against the direction of flow of material in the mixing chamber 11.

The gas used is ordinarily air.

The filling rate in the circulation zone C is advantageously less than 1. It seems that helps make possible a stable, regular and smooth circulation of the air. This filling rate of less than 1 is obtained, as described in U.S. Pat. No. 5,626,420, through experimental tests, by varying the shape of the rotor and/or stator in that zone, by varying the volume of the chamber, by varying the temperature set for the walls of the stator, etc.

Furthermore, in order to obtain good tightness of that zone, the latter is situated between two propulsion zones P2 and P3 that bring about below each of them, as indicated in FIG. 1, the formation of zones of filling rates equal to 1, which encompass between them the zone C where the air circulates.

The circulation of air in circulation zone C can be obtained either by drawing up all of the gases present in the mixing chamber through outlet 71, or by injecting the air under pressure through inlet 70, connecting that inlet with a compressed air source by means of a pressure reducing valve. The latter solution is more flexible and is therefore preferable.

Figure 2:
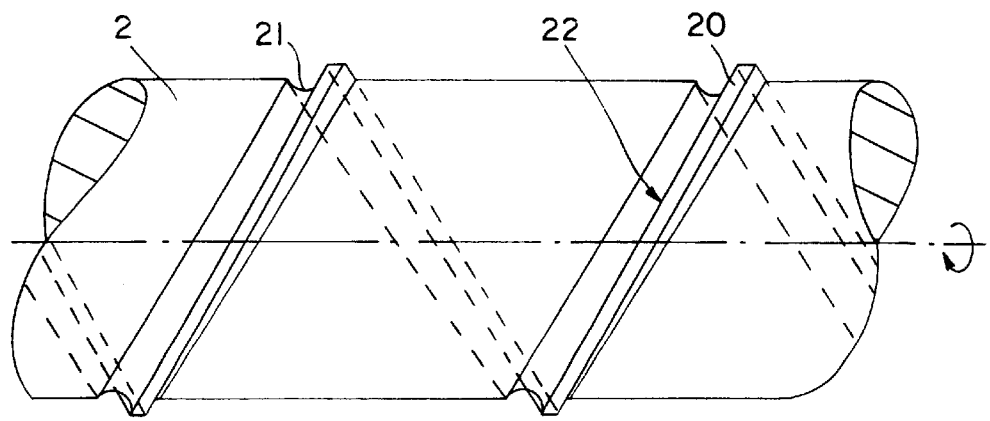
FIG. 2 is a side view of a portion of the rotor in the circulation zone.

FIG. 2 shows a variant embodiment of the mixing apparatus according to the invention, which contains a rotor portion 2 whose surface has a groove 21 making it possible to create an inner channel through which the stream of gas can circulate. A continuous thread 20 is shown in FIG. 2, containing such a groove 21 beside its rear face 22, taking into account the direction of rotation of the rotor 2 indicated in the figure. The groove 21 is U-shaped. The arm of the U closest to the thread 20 extends radially inward along the rear face 22 of the thread 20. The other arm is slightly divergent. The surface of the straight section of the groove 21 is of the same order of magnitude as the surface of the straight section of the projection of to the thread 20.

To obtain good stability of the stream of air, it is preferable for that groove 21 to extend over practically the entire circulation zone. Such a groove has the advantage of improving the stability of the rubber compound in the mixing chamber.

Figure 3:
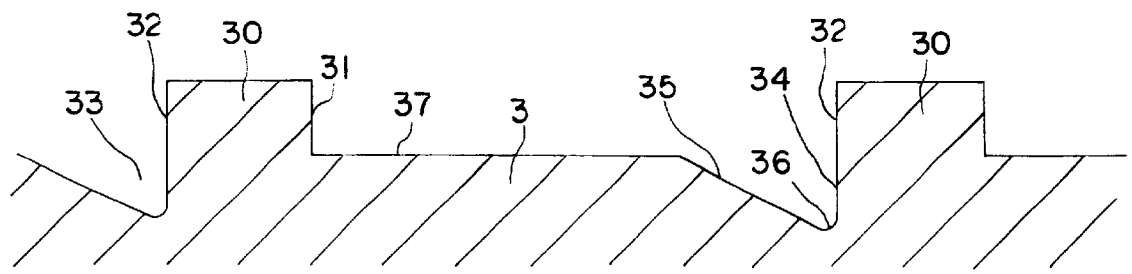
FIG. 3 is an axial partial section of a portion of the rotor in the circulation zone.

FIG. 3 shows another variant of a groove 33. The rotor portion 3 contains a thread 30 with a front face 31 and a back face 32. The groove 33 adjoins the back face 32 of the thread 30. Said groove 33 is in the shape of an inclined V. It contains a first wall 34 which extends radially inward along the back face 32 of the thread 30 and a second wall 35 which connects the bottom 36 of the V to the surface 37 of the rotor 3. The angle between the two sides of the V ranges between 50 and 80 degrees. The bottom 36 of the V has a small radius of curvature. The marked divergence of the two sides of the V facilitates the removal of any particle of the rubber compound which should enter the groove 33. In addition, the small radius of curvature 36 of the bottom of the V impedes clogging of the groove 33.

Upon starting of the mixing apparatus, one can choose to wait, in order to put the air circulation in zone C into operation, for the mixing chamber to be filled with material and for extrusion of the rubber compound to have begun through the discharge 58. The circulation zone in the mixing chamber is thus relatively tight.

The air intake flow and pressure is experimentally regulated in order to obtain a good extraction of the products in gaseous phase linked to the constituents of the rubber compound and/or to their mixing.

Tests have been performed with a silica-reinforced rubber compound corresponding to the formulation marked I in Table 1 of patent application EP 0,501,227-A1, incorporated herein by way of reference.

The preparation of such a mixture in the continuous mixer without air circulation results, notably, in an increase of five points in Shore A hardness and a more than 50% reduction of calcining time by comparison with the standard batch process. On the other hand, with a circulation of air, one finds that the properties of the mixtures correspond to those obtained with a standard batch process. An improvement of the regularity of flow of material as well as of properties of the rubber compounds is also observed.

These results show that, according to the process proposed by the invention, installing air circulation in the mixing chamber should make it possible to extract the volatile constituents and, notably, water present in the silica or liberated by the reactions directed at bonding the silica with the elastomers in the course of mixing.

It has also been observed that this process is effective in extracting, in whole or in part, the volatile constituents (water) present in other constituents of the rubber compounds, for example, elastomers or carbon blacks.

We claim:

1. A continuous mixing process for preparing a rubber compound in an elongated mixing chamber defined by the volume between the radially inner surface of a stator and the radially outer surface of at least one rotor in rotation in said stator, comprising:

continuously introducing in the mixing chamber different constituents, including at least one base elastomer and at least silica as reinforcing filler, said constituents being such that their mixing is capable of producing inside the mixing chamber the appearance of at least one product in gaseous phase, channeling the different constituents from their point of introduction to an outlet of the mixing chamber, and circulating, through a discrete groove in the rotor in open communication with at least part of the mixing chamber, a stream of gas against the direction of flow of the materials in the mixing chamber, so as to carry said gaseous phase across a gas circulation zone within the mixing chamber between a downstream gas inlet and an upstream gas outlet.

2. A process according to claim 1, in which said stream of gas is circulated in a zone of said mixing chamber which has a rate of filling less than 1.

3. A process according to claim 1, in which said gas is air.

4. A continuous mixing apparatus for preparing a rubber compound within an elongated mixing chamber, said apparatus comprising:

at least one rotor rotatable in a stator with a continuous thread having a rear-face and a front-face formed on the stator and/or rotor and said mixing chamber being substantially a first helical groove defined between the radially inner surface of said stator and the radially outer surface of said rotor;

an upstream end and a downstream end between which the material progressively flows;

at least one material inlet through which said mixing chamber receives constituents of the rubber compound;

an outlet through which the rubber compound is discharged; and means for circulating a gas through at least a portion of said chamber, called a circulation zone, and for extracting the gas upstream of the outlet;

wherein said circulation zone includes a discrete gas circulating second groove in communication with the mixing chamber and extending continuously through the circulation zone and wherein said discrete gas circulating second groove is a helical groove adjacent to the rear face of the continuous thread.

5. An apparatus according to claim 4, in which the gas circulating second groove is U-shaped.

6. An apparatus according to claim 4, in which said gas circulating second groove is in the shape of an inclined V.

7. An apparatus according to claim 6, in which the two arms of the V form an angle between them ranging between 50 and 80 degrees.

8. An apparatus according to claim 4, in which the circulation zone is downstream of the at least one material inlet.

9. An apparatus according to claim 4 in which, above and below the circulation zone, the shape of the rotor and/or stator surface is such that the mixing chamber has a filling rate equal to 1.

10. An apparatus according to claim 4, in which the means for circulating said gas includes at least one gas inlet, situated at one end of the circulation zone, and at least one gas outlet, situated at the other end of said circulation zone.

11. An apparatus according to claim 10, in which the means for circulating said gas include means for injecting a gas under pressure into said chamber through said at least one inlet.

12. An apparatus according to claim 11, in which the means for circulating and extracting said gas include means for drawing the gas out of said chamber through said at least one outlet.

13. An apparatus according to claim 4, in which the mixing chamber contains a single rotor.

* * * * *

UNITED STATES PATENT AND TRADEMARK OFFICE
CERTIFICATE OF CORRECTION

PATENT NO.    : 6,312,148 B1  Page 1 of 1
DATED         : November 6, 2001
INVENTOR(S)   : Deal et al.

It is certified that error appears in the above-identified patent and that said Letters Patent is hereby corrected as shown below:

Title page,
Item [73], Assignee, "Societe" should read -- Société --
Before Item [63], insert Item [30],
-- [30] Foreign Application Priority Data:
    Feb. 11, 1999 (FR) ........... 96 01689 --

Column 3,
Line 2, "cutaway" should read -- cut away --
Line 4, "zone;and" should read -- zone; and --

Column 5,
Line 45, "rear-face" should read -- rear face --; and
"front-face" should read -- front face --

Column 6,
Line 11, "outlet;" should read -- outlet, --

Signed and Sealed this

Ninth Day of September, 2003

JAMES E. ROGAN
*Director of the United States Patent and Trademark Office*